S. W. MARSTON.

Revolver.

No. 783. Reissued July 26, 1859

Inventor

Stanhope W. Marston

N. PETERS, PHOTO-LITHOGRAPHER, WASHINGTON, D. C.

UNITED STATES PATENT OFFICE.

JAMES M. COOPER, OF NEW YORK, N. Y., ASSIGNEE OF STANHOPE W. MARSTON.

IMPROVEMENT IN TRIGGER-OPERATING REVOLVING-BREECH FIRE-ARMS.

Specification forming part of Letters Patent No. 7,887, dated January 7, 1851; Reissue No. 783, dated July 26, 1859.

*To all whom it may concern:*

Be it known that STANHOPE W. MARSTON, of the city of New York, in the State of New York, has invented certain new and useful Improvements in Revolving-Breech Fire-Arms; and I do hereby declare that the following is a full, clear, and exact description thereof, reference being had to the annexed drawings, forming part of this specification, in which—

Figure 1:
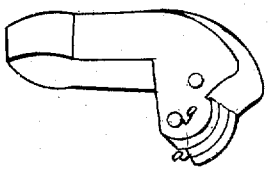
Figure 2:
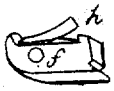
Figure 3:
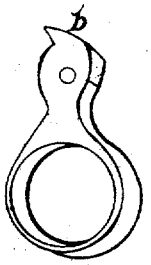
Figure 5:
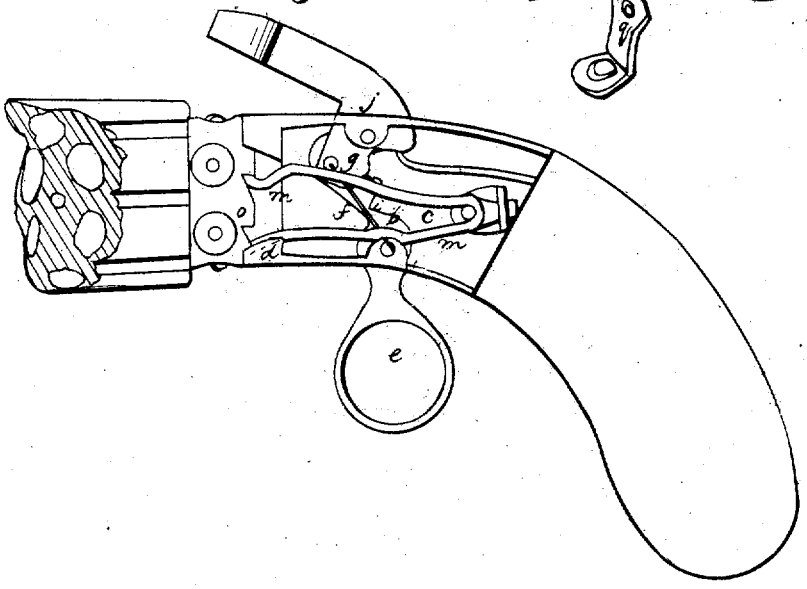
Figure 4:
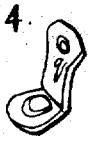

Figure 1 is a perspective view of the hammer by which the pistol is fired. Fig. 2 is a representation of the fly-tumbler or vibrating tooth detached from the hammer. Fig. 3 is a representation of the trigger, showing the shape of the sear or end of the trigger by which the fly-tumbler is operated. Fig. 4 represents the spring-rest by which the spring which rotates the breech is sustained and kept in place. Fig. 5 is a side view of a revolver or pistol with revolving breech, with one side of the lock-frame removed to exhibit the construction and arrangement of the parts of the lock.

STANHOPE W. MARSTON's invention consists in certain improvements in that class of fire-arms usually called "revolvers," which are furnished with a revolving many-chambered barrel or cylinder, which is made to rotate on its axis sufficiently to bring one of the nipples within the range of the stroke of the hammer each time that the trigger is drawn back, and so constructed and arranged as to fire off the charge in each of the chambers or barrels successively by merely pulling the trigger.

These improvements are, so constructing and arranging the parts of the lock in revolving-breech fire-arms as that not only shall the revolving breech be rotated and the hammer raised by drawing back the trigger, but the hammer shall either stand at the point of full-cock until the trigger receives a further pressure or be fired by a single pull of the trigger, at the pleasure of the operator, effecting the raising of the hammer and allowing it to stand at the point of full-cock by means of a fly-tumbler or vibrating tooth interposed between the hammer and tumbler, and operated by the trigger without the use of any pawl, dog, or other contrivance to sustain the hammer in its raised position; and the use of a fly-tumbler or vibrating tooth constructed and arranged as hereinafter described, for the purposes above named.

In order to enable others skilled in the art to make and use these improvements, I will proceed to describe their construction and operation.

In the drawing Fig. 5, A is the stock of the pistol. B is the lock-frame, to which the several parts of the lock are attached.

C is the revolving breech or magazine, having any convenient number of bores *r r*, &c., to contain the charge. In the neck of this breech are the nipples or cones *s s*, &c., to receive the percussion-caps, and on the circumference of the neck of the breech, at the rear end, which enters the cavity of the lock-plate A, are as many ratchet-teeth *o o*, &c., as there are chambers in the revolving breech. The chambered breech C is connected with the lock-plate by a spindle or other suitable device in any of the ordinary modes of constructing such fire-arms.

The hammer *a* is attached to the lock-frame A by the hammer-pin *j*, the lower part of the hammer—that is, all below the hammer-pin—being placed inside of the cavity of the lock-frame. The center pin, *j*, is so situate that the head of the hammer will fall over and strike whichever of the nipples *s* may happen to be at the top of the pistol.

D is the mainspring, attached to the stock of the pistol in the usual manner, and its free end resting upon and pressing upward against the heel of the hammer, back of its center pin, *j*. The toe of the hammer extends forward below the center pin, *j*, and near the extremity of the toe is a pin-hole, *g*, (see Fig. 1,) for the pin, by which the vibrating tooth or fly-tumbler *f* is pivoted to the hammer. The toe of the hammer is slotted (see *n*, Fig. 1) from the point of the toe toward the center pin, *j*, to receive the fly-tumbler *f*. This fly-tumbler or vibrating tooth is of the shape shown in Fig. 2, having a hole, *g'*, near the front end, corresponding with the hole *g* in the toe of the hammer, to receive the tumbler-pin $g^2$, Fig. 5. The rear end of the fly-tumbler *f* is blunt, and has a notch, *t*, near its lower edge to receive the point of the sear of the trigger. In front of the pin-hole $g'$ the fly-tumbler is turned up at $v$, forming a hooked projection, which is designed to rest against the front edge of the hammer above the slot $n$, to prevent the fly-tumbler being pressed too far forward in the hammer. A fine spring, $h$, on the upper face of the fly-tumbler presses against the hammer, inside of the slot $n$ under the hammer-pin $j$, and causes the fly-tumbler to react after being pressed back by the sear of the hammer, as hereinafter described. The fly-tumbler is set in the slot $n$ in the toe of the hammer and secured by a pin, $g^2$, and has a slight play up and down, the hooked projection $v$ preventing it passing farther forward than is shown in Fig. 5, and the shape of the slot $n$ in the hammer allowing it to pass backward and upward sufficiently far to allow the trigger to regain its position after firing.

The trigger $e$, of the shape shown in Fig. 3, is attached to the lower part of the lock-frame by a trigger-pin, $x$. At the upper end of the trigger is the sear $b$, by which the fly-tumbler is operated. The sear $b$ is so long or projects so far up in the lock as to strike against the blunt end of the fly-tumbler when the trigger is drawn back, the fly-tumbler being pressed downward by its spring $h$. Whenever the sear of the trigger is back of the fly-tumbler, (which is its proper position before the pistol is fired,) if the trigger is drawn backward its sear will press forward against the blunt end of the fly-tumbler, and in its endeavor to pass it it will pass down the end of the fly-tumbler, at the same time raising the hammer until the point of the sear of the trigger enters the notch $t$ with a click perceptible to the finger of the operator, at which point the parts assume the relative position shown in Fig. 5, and the hammer will stand cocked in that position without any tendency to fall until the trigger is further drawn back, when the sear, slightly raising the hammer, slips out of the notch $t$, and the hammer, now having no support, falls down on the nipple of the rotating breech and fires the pistol.

The reason for the hammer standing in the position shown in Fig. 5—at full-cock—is that the pressure applied to the trigger by the hand of the operator has the effect to bring the point of contact of the sear $b$ and the fly-tumbler in front of a line drawn from the point $g^2$ (the center of the tumbler-pin) and the point $x$, (the center of the trigger-pin,) whereas before the hammer is raised the point of contact is behind that line. Now, as soon as that point of contact falls exactly in the line between $x$ and $g$ (as it must do before passing from behind that line to the front of it) the effective pressure of the mainspring D to cause the descent of the hammer is in the immediate line between $g$ and $x$, and is completely sustained by the trigger-pin $x$, so that the point of contact between the sear and the fly-tumbler has no more tendency to pass forward than backward, but is in equilibrio, and consequently the hammer will retain that position until the point of contact is thrown on either side of the line between $g$ and $x$, (indicated by a red line in Fig. 5.) The force of the mainspring now no longer tends to cause the descent of the hammer, but to keep the hammer and trigger at rest; but the moment the trigger is pressed a little farther back the sear slips forward out of the notch in the fly-tumbler, and the hammer, having no support, is forced down by the mainspring.

If, instead of firing the pistol after the hammer has been raised by the trigger to stand at full-cock, it is desired to lower the hammer without firing the pistol, this may readily be effected by pressing the trigger gently forward, which has the effect of lowering the hammer to its place so easily as not to cause the explosion of the percussion-cap on the nipple. If, however, it is desired to fire the pistol without allowing the hammer to stand at cock, it is only necessary to continue the pressure on the hammer after the click which indicates the cocking of the hammer is felt without pausing, and the piece may be as readily and rapidly fired as though it were not so made as to stand at full-cock. By this arrangement and the use of the fly-tumbler the hammer of trigger-operating fire-arms may be raised and retained at full-cock, while the trigger remains set in a drawn position ready to be fired at the touch by simply drawing the trigger and without the use of any dog, pawl, catch, or other mechanical device to sustain the parts in their relative position of full-cock, which has, I believe, never before been accomplished by the operation of the trigger alone. The great advantage of this arrangement is that it obviates the difficulty experienced in trigger-operating fire-arms of the unsteadiness of aim caused by the force necessarily applied to the trigger to raise the hammer, for in trigger-operating fire-arms as constructed before this invention the resistance of the mainspring increases as the hammer is raised, and is greatest just at the time when the hammer is about to fall, when the violent effort to raise the hammer, followed by the sudden relaxation of the muscles of the hand consequent on the release of the pressure of the mainspring, causes a shaking, which destroys the accuracy of aim. By this arrangement, however, by which the hammer of a revolving fire-arm is made to stand at cock by operating the trigger, the resistance of the mainspring to the finger of the operator diminishes as the hammer rises and ceases altogether before the hammer begins to fall, which enables the operator to hold his hand steady while firing the pistol.

The rotation of the breech by drawing the trigger is accomplished as follows: A bent spring, $m$, Fig. 5, is set in the cavity of the lock-frame, having its lower leg fixed in a cavity at $d$, in the lower part of the lock-frame, near the neck of the breech. The lower leg of the spring may be made to pass alongside of the sear $b$ of the trigger, so as to steady its motion. The rear end of the spring at the junction of its two legs is attached to a spring-rest, *l*, of the shape shown in Fig. 4, the end of the spring *m* entering a hole, *q*, in the spring-rest. This spring-rest sustains the spring *m*, and prevents it getting out of place, keeping it pressed forward toward the rotating breech. The upper leg of the spring passes under the pin $g^2$ of the fly-tumbler, which (the pin $g^2$) projects beyond the fly-tumbler far enough to rest on the spring *m*, and the front extremity of the upper leg of the spring *m* rests on and presses up against the one of the ratchet-teeth *o* on the neck of the chambered breech. This effects the rotation of the breech in the following manner: When the hammer is raised by the trigger, as before described, the point of the toe of the hammer rises, turning on *j* as its center, and the projecting pin at *g* rising also, allows the expansion of the spring *m*, which, as the lower leg of the spring *m* is fixed at *d*, causes the extremity of the upper leg, which is resting against one of the ratchets, *o'*, in the neck of the breech, to rise and thus rotate the breech far enough to bring one of the nipples under the hammer. As the hammer falls to fire the pistol the pin *g* on the toe of the hammer is lowered and depresses the leg of the spring *m* on which it rests sufficiently to cause it to slide down the inclined face of the ratchet-tooth $o^2$, and pass under and engage the tooth $o^2$, the spring-rest allowing the retrocession of the spring *m* sufficiently for its end to pass over the point of the ratchet-tooth, and then pressing it up under the face of the tooth. The spring *m* is now ready to cause another partial revolution of the rotating breech on the raising of the hammer, as before explained. Thus by the drawing of the trigger the breech is rotated, and the trigger itself is set and retained in a drawn position, and the hammer is raised to and sustained at full-cock, or may be fired at once, at pleasure.

Having thus described STANHOPE W. MARSTON'S improvement in trigger-operating revolving-breech fire-arms, I do not claim, broadly, rotating the breech and firing the pistol by simply operating the trigger; but

What I do claim as his invention, and desire to secure by Letters Patent, is—

1. So constructing the lock of revolving-breech fire-arms, in the mode substantially as hereinbefore described, or its equivalent, as that the trigger used to fire the pistol, when drawn back, raises the hammer to full-cock, and there retains it, the revolving breech or barrels being at the same time rotated so far as to bring the nipple of one of the chambers or barrels in the proper position to be struck by the hammer on its descent, and the trigger being held in a drawn position ready for instantaneous firing.

2. The use of a fly-tumbler or vibrating tooth intermediate between the hammer and trigger, in trigger-operating fire-arms, and the peculiar arrangement of the parts of the lock in connection therewith, hereinbefore described, whereby the tendency of the mainspring to cause the descent of the hammer is neutralized when the hammer reaches the point of full-cock, so that the hammer, having been raised by the trigger, may either be permitted to stand cocked or fired immediately, at pleasure, and greater ease in firing and steadiness of aim are secured, substantially as hereinbefore described.

JAMES M. COOPER.

In presence of—
JOHN S. BLAINE,
JAMES CRAWFORD.